(12) United States Patent
Nishiyama et al.

(10) Patent No.: US 6,340,857 B2
(45) Date of Patent: *Jan. 22, 2002

(54) MOTOR HAVING A ROTOR WITH INTERIOR SPLIT-PERMANENT-MAGNET

(75) Inventors: Noriyoshi Nishiyama; Tomokazu Nakamura, both of Osaka; Yasufumi Ikkai, Hyogo; Masaki Ogushi, Nara; Yasuhiro Kondo, Osaka, all of (JP)

(73) Assignee: Matsushita Electric Industrial Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/471,375

(22) Filed: Dec. 23, 1999

(30) Foreign Application Priority Data

Dec. 25, 1998  (JP) ............................................ 10-369167

(51) Int. Cl.[7] ............................................... H02K 21/16
(52) U.S. Cl. ............................. 310/156.53; 310/156.21; 310/156.41
(58) Field of Search .......................... 310/156, 156.82, 310/156.83, 156.36, 156.38, 156.41, 156.47, 156.53, 156.21; 318/701

(56) References Cited

U.S. PATENT DOCUMENTS

| 4,139,790 | A | * | 2/1979 | Steen ........................... 310/156 |
| 4,510,680 | A | * | 4/1985 | Miller et al. ................. 310/156 |
| 4,559,463 | A | * | 12/1985 | Kobayashi ................... 310/156 |
| 4,935,080 | A | * | 6/1990 | Hassell et al. ............... 310/154 |
| 5,191,256 | A | | 3/1993 | Reiter, Jr. et al. .......... 310/156 |
| 5,641,363 | A | * | 6/1997 | Fukuno et al. .............. 148/104 |
| 5,684,352 | A | | 11/1997 | Mita et al. ................... 310/156 |
| 5,838,086 | A | | 11/1998 | Cuenot et al. ............... 310/156 |
| 5,844,344 | A | | 12/1998 | Uetake et al. ............... 310/156 |
| 5,929,547 | A | | 7/1999 | Kim ............................. 310/156 |
| 5,936,323 | A | | 8/1999 | Shibukawa et al. ......... 310/156 |
| 5,962,944 | A | * | 10/1999 | Narita et al. ................ 310/156 |
| 6,057,621 | A | * | 10/1999 | Suzuki et al. ............... 310/156 |
| 6,008,559 | A | * | 12/1999 | Asano et al. ................ 310/156 |
| 6,049,153 | A | * | 4/2000 | Nishiyama et al. ......... 310/156 |

FOREIGN PATENT DOCUMENTS

| EP | 0 265 364 | 4/1988 | .......... H02K/15/02 |
| EP | 0 809 343 | 11/1997 | ............ H02K/1/27 |
| EP | 0 823 771 | 2/1998 | .......... H02K/21/16 |
| JP | 9-9537 | * 1/1997 | ............ H02K/1/27 |
| JP | 9-308-148 | * 11/1997 | ............ H02K/1/27 |
| JP | 9-327140 | 12/1997 | ............ H02K/1/27 |
| JP | 10-322948 | 4/1998 | ............ H02K/1/27 |
| JP | 11-98731 | 9/1999 | ............ H02K/1/27 |

* cited by examiner

Primary Examiner—Burton S. Mullins
(74) Attorney, Agent, or Firm—Wenderoth, Lind & Ponack, L.L.P.

(57) ABSTRACT

A motor includes a rotor with interior permanent magnets and a stator with teeth wound by concentrated windings. Each permanent magnet is split along a plane oriented towards the stator, and an electrically insulating section is set between the spilt magnet pieces. This structure allows each permanent magnet to be electrically split, thereby restraining the production of an eddy current. As a result, heat-production is dampened thereby preventing heat demagnetization of the permanent magnets.

9 Claims, 8 Drawing Sheets

MOTOR HAVING A ROTOR WITH INTERIOR SPLIT-PERMANENT-MAGNET

FIELD OF THE INVENTION

The present invention relates generally to a motor having a rotor with interior permanent magnets, more particularly it relates to a motor with interior split-permanent-magnets, such that it restrains eddy-currents from occurring and prevents demagnetization of the magnets.

BACKGROUND OF THE INVENTION

Figure 11:
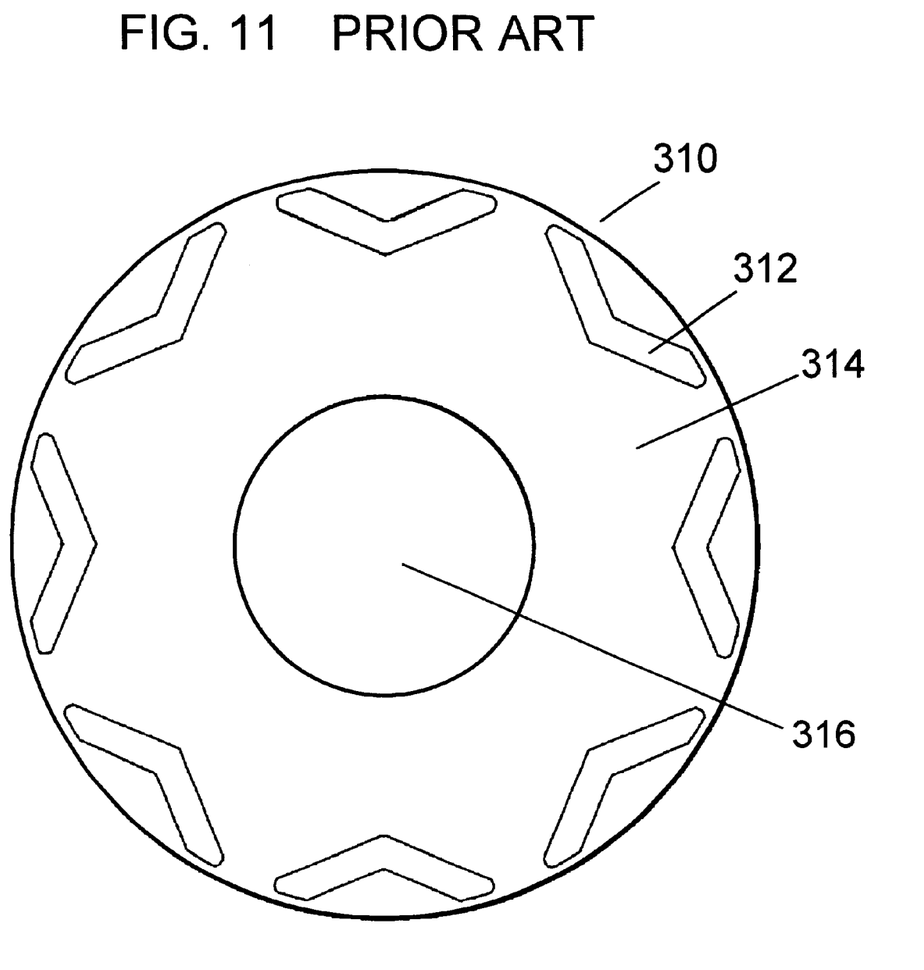
FIG. 11 is a cross sectional view illustrating a conventional motor having a rotor with interior permanent magnets.

FIG. 11 illustrates a rotor with interior permanent magnets of a conventional motor. The motor has rotor 310 in which permanent magnets 312 are embedded, and rotor 310 is disposed in a stator (not shown) with concentrated windings, so that the motor can be driven by not only magnet torque but also reluctance torque. This rotor is hereinafter referred to as a "rotor with interior permanent magnets".

However this conventional motor has the following problems:

Compared with a motor with a distributed-winding stator, a motor with a concentrated-wound stator subjects itself to greater changes of magnetic flux interlinked with rotor 310 when the motor rotates. As a result, a large eddy-current occurs in magnets 312 embedded in the rotor, and thus the motor with a concentrated-wound stator is vulnerable to irreversible demagnetization of the magnets Meanwhile, the distributed-winding stator is structured in the following way: A slot is formed between two stator-teeth, and a plurality of teeth thus form a plurality of slots. Windings striding over at least one slot are provided, and part of a winding of a phase exists between pitches of another phase winding. The concentrated-winding stator, on the other hand, is structured by providing a winding of one phase to one stator tooth respectively.

The reason why the motor having the concentrated-winding stator is vulnerable to demagnetization is detailed hereinafter.

It is well known that eddy current loss "$W_e$" is proportionate to a square of maximum operable magnetic-flux-density "$B_m$", and this relation can be expressed in the following equation.

$$W_e = P_t/t = \{1/(6\rho)\}\pi^2 f^2 B_m^2 t^2 [W/m^3]$$

where $P_t$=power consumption t=plate width interlinking with the magnetic flux $\rho$=resisting value proper to the permanent magnet f=exciting frequency Since the motor having the concentrated-winding stator is subjected to greater changes in magnetic flux running through the rotor, the maximum operable magnetic-flux-density "$B_m$" in the above equation becomes greater and thus eddy-current-loss "$W_e$" grows larger.

If a motor has the concentrated winding stator, and yet, the permanent magnets are stuck onto an outer wall of the rotor, the changes in magnetic-flux-density is not so large that the demagnetization of the magnets due to the eddy-current-loss is negligible. In the motor having the concentrated winding stator and a rotor in which the permanent magnets are embedded, the space between the magnet and the outer circumference of rotor core 314 forms a path for the magnetic-flux to flow. The density of magnetic-flux from the stator changes depending on the position of stator teeth with regard to the magnets, so that magnitude of changes in the magnetic-flux-density at the path is increased. As a result, eddy-current occurs in magnets 312 embedded in rotor 310, thereby heating the magnet to produce irreversible demagnetization of the magnet.

SUMMARY OF THE INVENTION

The present invention addresses the problems discussed above and aims to provide a motor having a rotor with interior-permanent-magnets. This rotor produces less eddy-current and can prevent demagnetization in the permanent magnets embedded in the rotor.

The motor of the present invention comprises the following elements:

a rotor in which permanent magnets are embedded, and a stator of which teeth are wound by windings in a concentrated manner.

The permanent magnets are split into magnet pieces, and insulating sections are inserted into respective gaps between respective magnet pieces. This structure splits the magnet electrically, thereby restraining the eddy-current from occurring and then suppressing the heat-demagnetization the magnets embedded into the rotor.

DETAILED DESCRIPTION OF THE INVENTION

Exemplary embodiments of the present invention are demonstrated hereinafter with reference to the accompanying drawings.

(Exemplary Embodiment 1)

Figure 1:
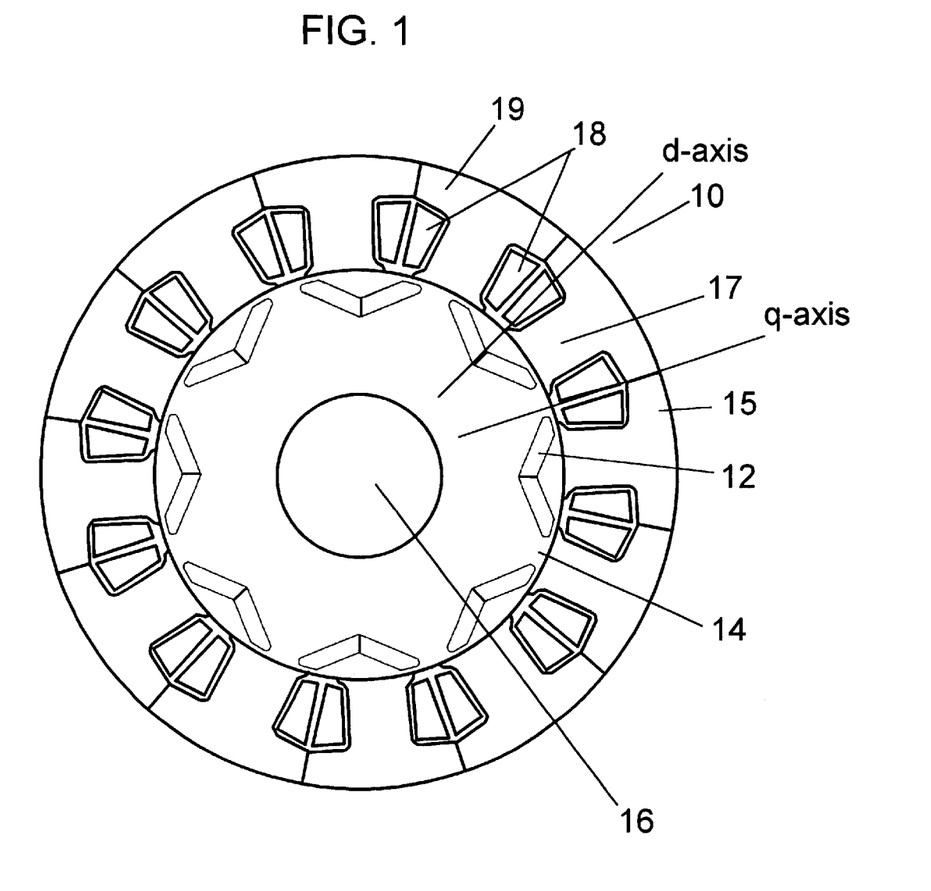
FIG. 1 is a cross sectional view illustrating a motor, having a rotor with interior permanent magnets, in accordance with a first exemplary embodiment of the present invention.
Figure 2:
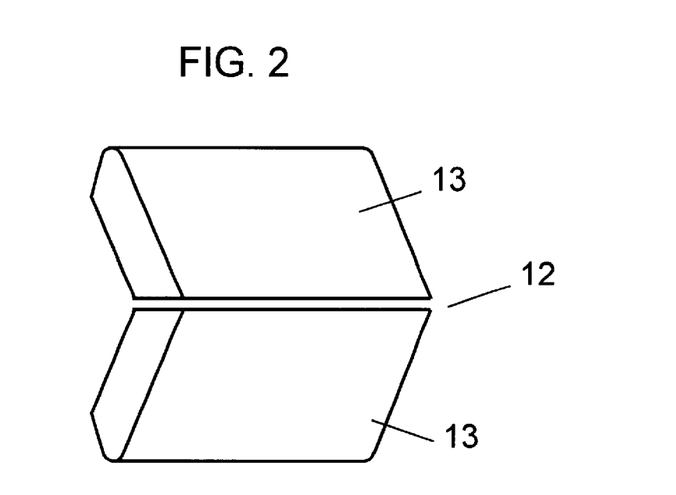
FIG. 2 is a perspective view of the permanent magnets to be embedded into the rotor of the motor shown in FIG. 1.

FIG. 1 is a cross sectional view illustrating a motor, having a rotor with interior permanent magnets, in accordance with the first exemplary embodiment of the present invention, and FIG. 2 is a perspective view of the permanent magnets to be embedded into the rotor of the same embodiment.

In FIG. 1, motor 10 includes rotor 14 with interior permanent magnets 12, and stator 15 facing to rotor 14 via an annular space. Respective teeth 17 of stator 15 are wound by windings 18 in a concentrated manner, i.e. concentrated windings are provided on respective teeth.

Rotor 14 comprises the following elements:

a rotor core laminated with a plurality of steel plates;

permanent magnets 12 embedded into slots axially provided; and a rotor shaft 16 extending through a center of the rotor core. Thus, the rotating shaft 16 provides the rotor 14 with an axis of rotation.

Respective magnets 12 have a shape protruding toward the center of rotor core. As such, the magnets are embedded into the rotor so that rotor 4 can produce respective directions for magnetic flux to flow with ease and with difficulty. An inductance ratio in respective directions can be thus obtained, and it is called a salient pole rate.

A rotor polarity is formed between magnets 12 and an outer wall of the rotor core which magnets 12 face. The magnetic-flux from a permanent magnet flows with ease through the section covering the rotor polarity, and this flowing direction is called "d axis". On the other hand, the magnetic-flux flows with difficulty through a section covering a boundary between two adjacent magnets, and this flowing direction is called "q axis".

Stator 15 is formed by linking twelve stator-blocks 19 to each other in an annular shape. Each stator block 19 comprises teeth 17 wound by windings 18 in the concentrated manner, and the blocks are welded to form a ring. In the case of a three-phase and eight-pole motor, for instance, windings are provided on a first four teeth, and these teeth are coupled with each other thereby forming phase "U". In the same manner, the windings provided on the second four teeth on the right side of the respective first four teeth discussed above are coupled with each other thereby forming phase "V". Further, the windings provided to the third four teeth on the left side of the first four teeth are coupled with each other thereby forming phase "W". Stator 15 thus forms three-phase with concentrated windings.

In motor 10 constructed above, the magnetic flux generated by magnet 12, i.e. the magnetic flux produced by the rotor-magnetic-poles, travels to teeth 17 of the stator via the annular space thereby contributing to the torque production. This motor has the salient-pole-rate and controls the current-phases to be optimal by current, thereby driving itself not only by the magnet torque but also by the reluctance torque.

One of the features of the present invention is a method of embedding the permanent magnets into the rotor. Magnets 12 to be embedded into rotor 14 in the first exemplary embodiment are detailed hereinafter.

As shown in FIG. 2, each magnet 12 is split into two magnet pieces 13 in the axial direction of rotor 14. Each two magnet pieces 13 are embedded into one single hole provided to rotor 14, thereby forming each magnet 12. Epoxy resin of an electrically insulating type, used as a coating material, is applied to the overall surface of each magnet piece 13. If magnet pieces 13 are stacked-up, each piece is electrically insulated and they can form an independent circuit. A space between respective stacked-up magnet pieces 13 is not less than 0.03 mm corresponding to the thickness of coating material applied to the magnet pieces.

The two magnet pieces 13 are embedded adjacently with each other into the hole of the rotor core so that magnet 12 is split into two sections facing stator 15. Respective magnet pieces 13 are arranged in the following way:

Respective magnetic-fluxes generated from two magnet pieces embedded in one hole flow in the same direction with regard to the outer wall of the rotor to which these two magnet pieces face. Another pair of magnet pieces embedded into a hole adjacent to the hole discussed above generate the magnetic flux in the direction reversed to the direction of the magnetic flux discussed above. For instance, two magnetic pieces embedded into one hole face the outer wall of the rotor with poles "N", then another pair of magnet pieces embedded Pinto the hole adjacent to this hole should face to the outer wall with poles "S".

The space between the two magnet pieces is not necessarily filled with resin, and it can be filled with any electrically-insulating-material, or can include an air-gap.

Magnet 12 is split by a plane facing toward stator 15, thereby reducing the eddy current produced in magnet 12. The plane extends from the rotor center toward the stator. This is because of the following reason:

Since teeth 17 are wound by concentrated windings 18, stator 15 receives greater changes in the density of magnetic-flux supplied from teeth 17. The maximum operable magnetic-flux-density $B_m$ expressed in the equation discussed previously thus grows greater. This change in the magnetic-flux-density produces the eddy current in each magnet 12. In this first exemplary embodiment, each magnet 12 embedded in rotor 14 is split into two magnet pieces 13, and epoxy resin, which is non-magnetic material, is put between these two pieces, thereby dividing magnet 12 not only physically but also electrically. As a result, the production an eddy current is restrained by narrowing the width "t" a plate interlinking with the magnetic flux in the equation discussed previously.

(Exemplary Embodiment 2)

Figure 3:
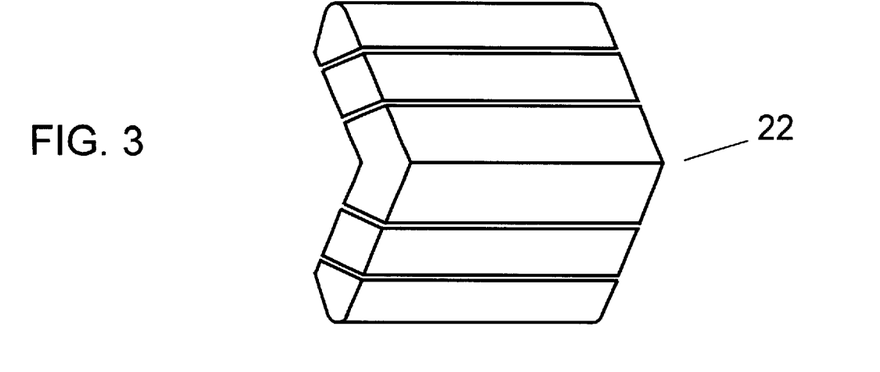
FIG. 3 is a perspective view of permanent magnets to be embedded into a rotor of a motor in accordance with a second exemplary embodiment of the present invention.

FIG. 3 is a perspective view of permanent magnets to be embedded into a rotor of a motor in accordance with the second exemplary embodiment of the present invention. This second embodiment differs from the first one in the way of splitting the magnet, and otherwise remains the same.

In the first embodiment, the magnet is split into two pieces in the axial direction, however magnet 22 in this second embodiment is split into five pieces in the axial direction, and this produces the same advantage produced in the first embodiment.

(Exemplary Embodiment 3)

Figure 4:
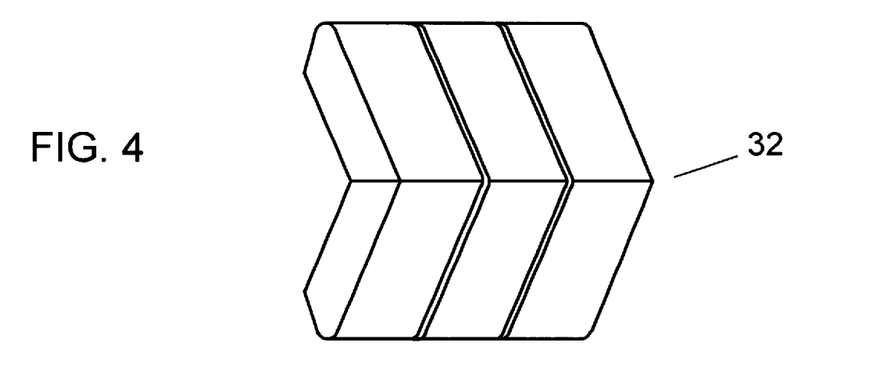
FIG. 4 is a perspective view of permanent magnets to be embedded into a rotor of a motor in accordance with a third exemplary embodiment of the present invention.

FIG. 4 is a perspective view of permanent magnets to be embedded into a rotor of a motor in accordance with the third exemplary embodiment of the present invention. This third embodiment differs from the first one in the way of splitting the magnet, and otherwise remains the same.

In the first embodiment, the magnet is split into two pieces in the axial direction, however magnet 32 in this third embodiment is split into three pieces in a vertical direction with regard to the axial direction, and this produces the same advantage as produced in the first embodiment.

The first, second and third embodiments prove that the magnets split into pieces along planes facing to the stator can restrain the production of eddy current.

(Exemplary Embodiment 4)

Figure 5:
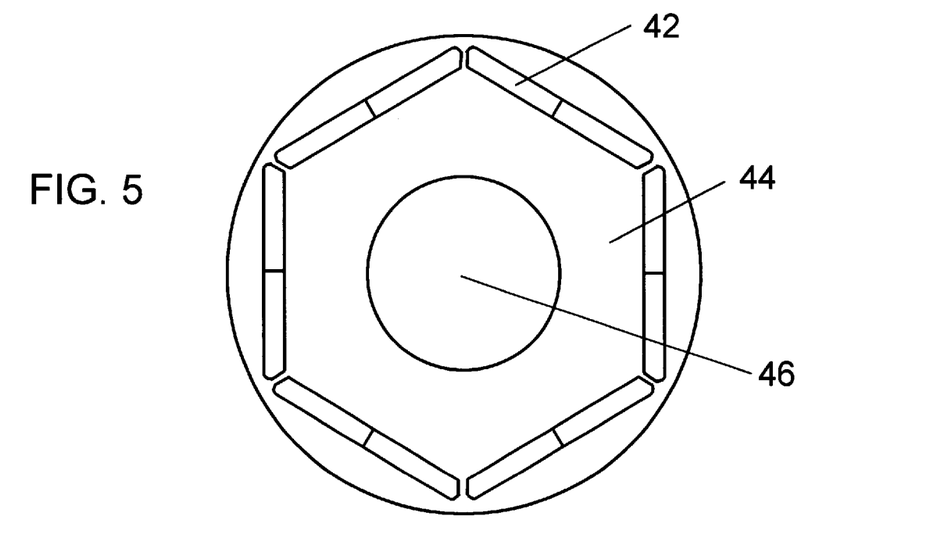
FIG. 5 is a cross sectional view illustrating a rotor of a motor, in which "I" shaped permanent magnets are embedded, in accordance with a fourth exemplary embodiment of the present invention.

FIG. 5 is a cross section illustrating a rotor of a motor, in which "I" shaped permanent magnets are embedded, in accordance with the fourth exemplary embodiment of the present invention. This fourth embodiment differs from the previous embodiments 1–3 in the shape of magnet. In the previous embodiments, the magnet is in a "V" shape, however, magnet 42 in the fourth embodiment is shaped like the letter "I".

In FIG. 5, each magnet 42 formed by two magnet pieces aligned in an "I" shape is inserted into each hole provided in rotor 44. Electrically insulating material is put between the two pieces, or an air gap can be used to electrically insulated the two pieces. The fourth embodiment can produce the same advantage as produced in the first embodiment.

Regarding the shape of the magnet, the embodiments 1–3 employ a "V" shape, and this fourth embodiment employs an "I" shape, however, the shape can be an arc being bowed toward the rotor center being bowed toward the rotor center.

(Exemplary Embodiment 5)

Figure 6:
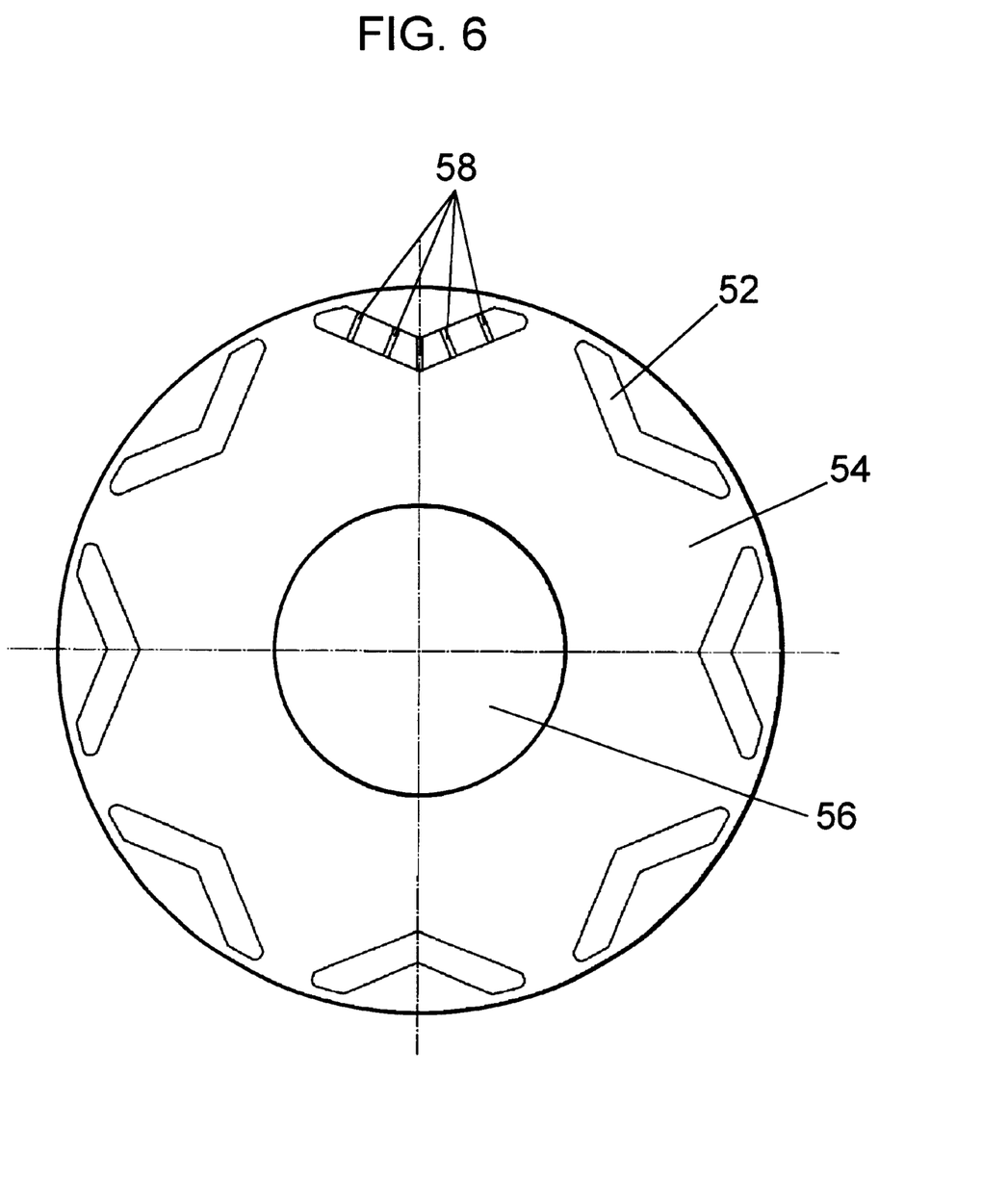
FIG. 6 is a cross sectional view illustrating a rotor of a motor, in which permanent magnets are embedded, in accordance with a fifth exemplary embodiment.
Figure 7A:
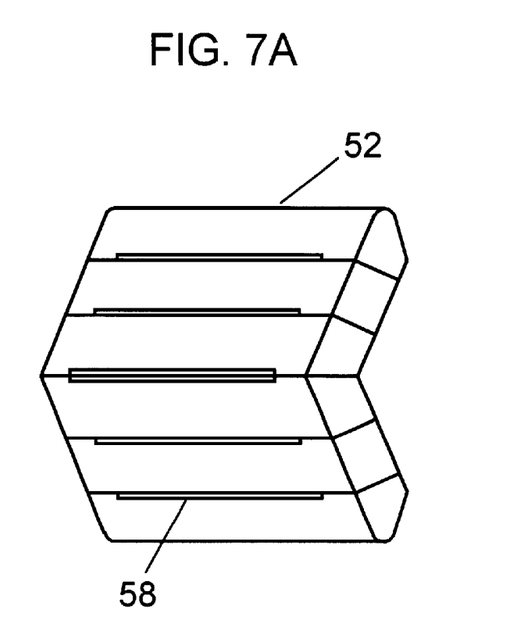
FIG. 7A is a perspective view of permanent magnets to be embedded into the rotor of the motor in accordance with the fifth exemplary embodiment.
Figure 7B:
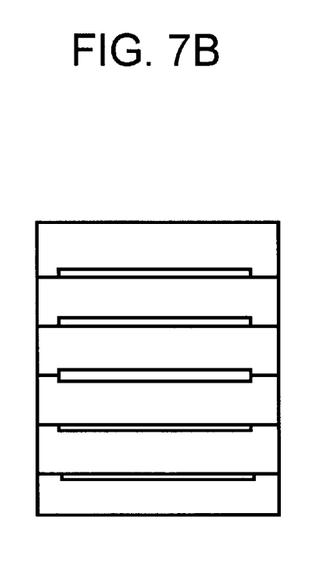
FIG. 7B is a front view of the permanent magnets shown in FIG. 7A.

FIG. 6 is a cross sectional view illustrating a rotor of a motor, in which permanent magnets are embedded, in accordance with the fifth exemplary embodiment. FIG. 7A is a perspective view of the permanent magnets to be embedded into the rotor of the motor in accordance with the fifth exemplary embodiment, and FIG. 7B is a front view of the permanent magnets shown in FIG. 7A.

In FIG. 6, permanent magnets 52 are embedded in rotor 54, and rotary shaft 56 extends through the rotor center. This motor has a stator (not shown) disposed around rotor 54 via an annular space.

Magnet 52 is formed by laminating a plurality of rare-earth-sintered-magnet pieces. Air gaps 58 are provided between respective magnetic pieces. Magnet 52 is bowed toward the rotor center.

Magnet 52 is further detailed with reference to FIGS. 7A and 7B.

Magnet 52 comprises a rare-earth-sintered magnet. In general, the rare-earth-sintered magnet is coated on its surface in order to avoid corrosion. Magnet 52 is formed by laminating six pieces of this rare-earth-sintered magnet. Two or more than two protrusions are provided on the respective faces laminated so that air gaps 58, as insulating layers, are provided for each magnet piece. The total area of the protrusions formed on each magnet piece should be smaller than the area of the face laminated, e.g. not more than 10% of the face laminated. The number of magnet pieces is not limited to six but other plural numbers are acceptable as far as they can provide air gaps between each magnet piece.

As such, since magnet 52 has insulating layers (air gaps) between respective magnet pieces making up magnet 52, it is difficult for current to run through magnet 52. As a result, the production of an eddy current is restrained. Meanwhile, magnet 52 employs a conductive coating material to avoid corrosion, however, the material can be an insulating one, or further, respective air gaps can be filled with insulating resin thereby enhancing the strength of magnet 52. The protrusions formed on each magnet piece can be made from another material and disposed on each magnet piece. Electrically insulating material among others for forming the protrusions can produce the advantage distinctly.

(Exemplary Embodiment 6)

Figure 8A:
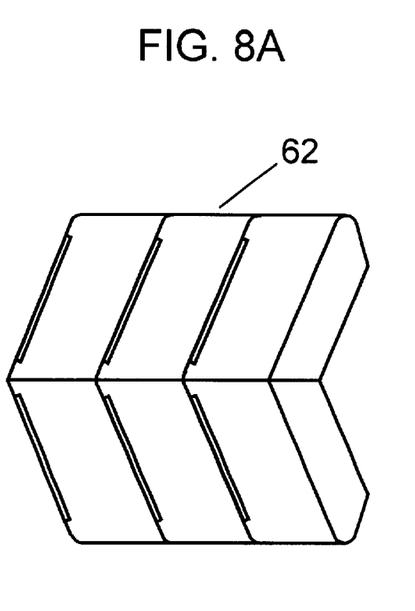
FIG. 8A is a perspective view of permanent magnets to be embedded into a rotor of a motor in accordance with a sixth exemplary embodiment.
Figure 8B:
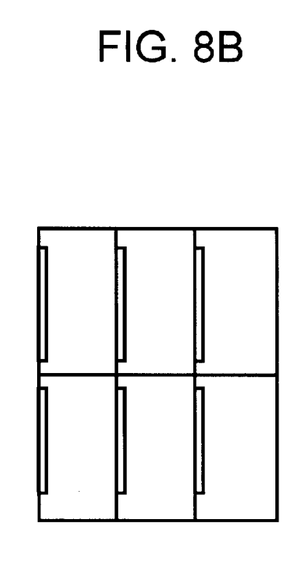
FIG. 8B is a front view of the permanent magnets shown in FIG. 8A.

FIG. 8A is a perspective view of permanent magnets to be embedded into a rotor of a motor in accordance with the sixth exemplary embodiment, and FIG. 8B is a front view of the permanent magnets shown in FIG. 8A.

This sixth embodiment differs from the fifth one in the way of splitting the magnet, and otherwise remains the same.

In the fifth embodiment, the magnet is split into six pieces in the axial direction, however, magnet 62 in this sixth embodiment is split into three pieces in a vertical direction with regard to the axial direction. The sixth embodiment can produce the same advantage as produced in the fifth one.

(Exemplary Embodiment 7)

Figure 9:
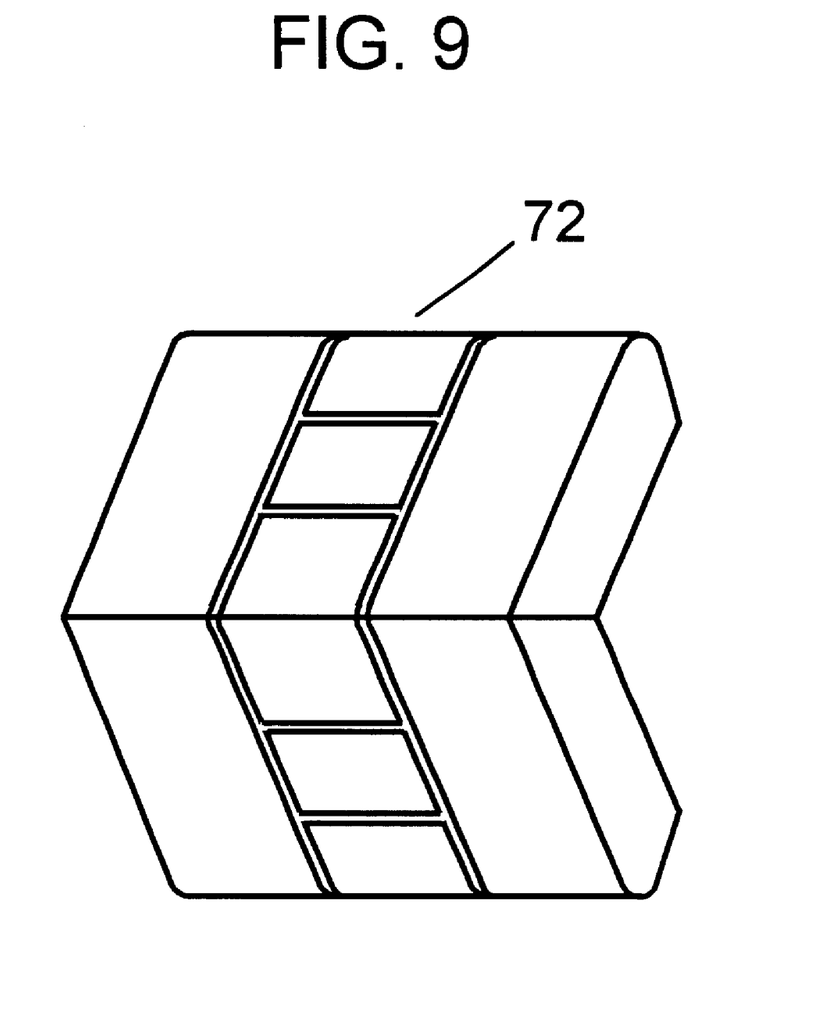
FIG. 9 is a perspective view of permanent magnets to be embedded into a rotor of a motor in accordance with a seventh exemplary embodiment.

FIG. 9 is a perspective view of permanent magnets to be embedded into a rotor of a motor in accordance with the seventh exemplary embodiment of the present invention.

This seventh embodiment differs from the fifth one in the way of splitting the magnet, and otherwise remains the same.

In the fifth embodiment, the magnet is split into six pieces in the axial direction, however, magnet 72 in this seventh embodiment is split into three pieces in a rotating direction, and a center piece of the three pieces is further split into five pieces in the axial direction. The seventh embodiment can produce the same advantage as produced in the fifth one.

When rare-earth-sintered magnets are used as interior permanent magnets in the rotor, splitting the magnet affects the advantage distinctly because a rare-earth-sintered magnet has less electrical resistance and, it is easier for current to run there through as compared to a ferrite magnet. (The specific resistance of the ferrite magnet is not less than $10^{-4}$ $\Omega \cdot m$, and that of the rare-earth-sintered magnet is not less than $10^{-6}$ $\Omega \cdot m$.) In other words, when the same magnitude of change in the magnetic-flux-density is applied from outside to the magnet, the rare-earth-sintered magnet allows the eddy current to run through more than 100 times in volume than the ferrite magnet does. Thus the split of such a magnet effectively restrains the production of an eddy current.

A driving control of the motor is demonstrated hereinafter, this motor includes the rotor with the interior magnets of the present invention.

A motor with a stator wound by concentrated windings produces greater changes in the magnetic-flux-density when the motor is driven under a magnetic-field control. In the motor having a rotor with interior permanent magnets, the magnetic-flux runs through the space between the magnets and the outer circumference of the rotor core, and thus the magnetic-flux is distributed unevenly between the rotor and the stator.

The magnetic-field control applies an inverse magnetic-filed to the motor so that the magnetic-flux produced by the magnet can be counteracted, and therefore, this control method produces greater changes in the magnetic-flux than does a regular control method. Further, the inverse magnetic-field narrows tolerance for irreversible demagnetization, and this produces a possibility of heat demagnetization at a temperature which is a matter of little concern in a normal condition. The magnetic-field-control thus produces distinctly an advantage of damping the heat generated by the eddy current.

It is preferable to restrain the production of an eddy current as well as the heat-generation from the eddy current by splitting the magnet, and this shows distinctly its effect when the motor is under magnetic-field-control.

The motor used in the embodiments discussed above is an inner-rotor type, i.e. a rotor is disposed inside a stator, however, an outer-rotor type, i.e. a rotor is disposed outside a stator, and a linear motor, i.e. a rotor moves linearly with regard to a stator, produce the same advantages.

As the exemplary embodiments discussed previously prove that the motor with interior permanent magnets of the present invention can restrain the production of an eddy current and dampen the demagnetization, because the magnet is electrically split and thus an area of each magnet facing the stator becomes narrower. The motor under the magnetic-field control can further dampen the demagnetization.

(Exemplary Embodiment 8)

Figure 10:
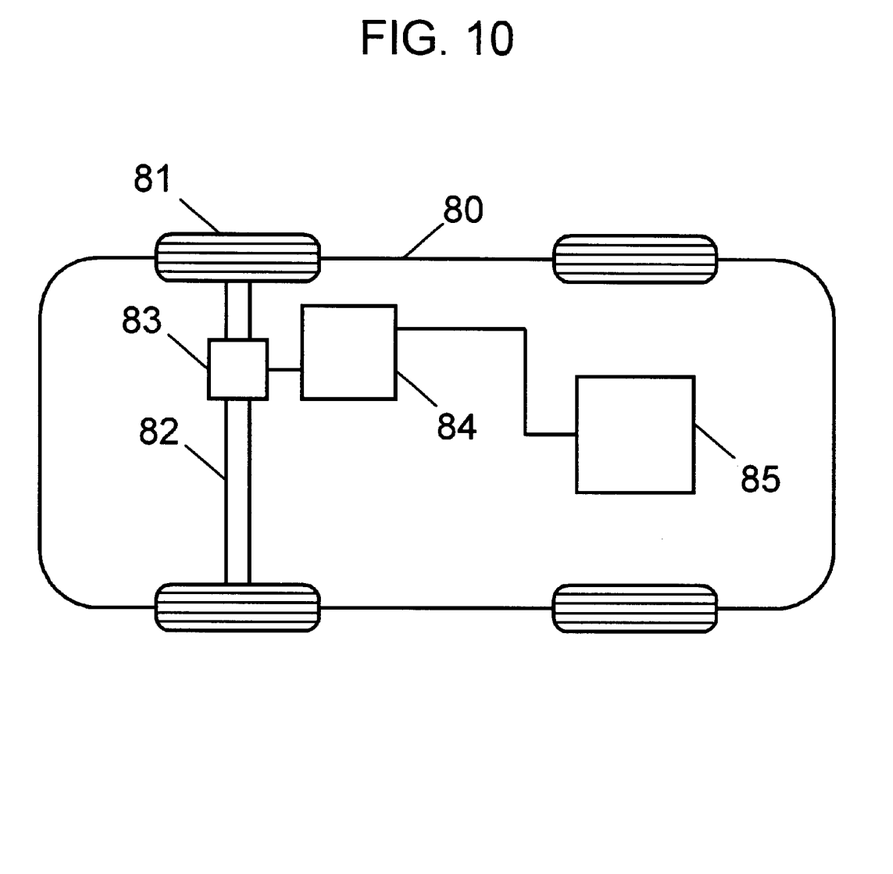
FIG. 10 is a block diagram of an electric vehicle in which the motor of the present invention is mounted.

FIG. 10 is a block diagram of an electric vehicle in which the motor of the present invention is mounted.

Body 80 of the electric vehicle is supported by wheels 81. This vehicle employs a front-wheel-drive method, so that motor 83 is directly connected to front-wheel-shaft 82. Motor 83 includes a stator being wound by concentrated windings and having interior permanent magnets as described in the exemplary embodiments previously discussed. Controller 84 controls the driving torque of motor 83, and battery 85 powers controller 84 and further powers motor 83. Motor 83 is thus driven, which then rotates wheels 81.

In this eighth embodiment, the motor is employed to drive the wheels of the electric vehicle. The motor can be employed also to drive wheels of an electric locomotive.

What is claimed is:

1. A motor comprising:
a rotor having an axis of rotation, and also having a first interior permanent magnet including at least two magnet pieces separated from one another in the direction of the axis of rotation by an electrical insulator having a thickness of at least 0.03 mm; and
a stator having teeth wound by concentrated windings.

2. A motor comprising:
a rotor having an axis of rotation, and also having a first interior permanent magnet including at least two magnet pieces separated from one another in the direction of the axis of rotation by an electrical insulator, with said electrical insulator comprising an air gap; and
a stator having teeth wound by concentrated windings.

3. A motor comprising:
a rotor having a first interior permanent magnet including at least two stacked magnet pieces each comprising a rare-earth-sintered magnet coated with an electrically insulating material such that the electrically insulating material separates the rare-earth-sintered magnets one from another, with said electrically insulating material comprising an epoxy resin;
a stator having teeth wound by concentrated windings; and
at least one other interior permanent magnet circumferentially spaced from said first interior permanent magnet and including at least two magnet pieces separated from one another by an electrical insulator, with each of said interior permanent magnets having an N pole and an S pole, wherein said first interior permanent magnet has its N pole facing said stator and each circumferentially adjacent said at least one other interior magnet has its S pole facing said stator.

4. The motor according to claim 3, wherein said epoxy resin has a thickness of at least 0.03 mm.

5. A motor comprising:
a rotor having a first interior permanent magnet including at least two stacked magnet pieces each comprising a rare-earth-sintered magnet coated with an electrically insulating material such that the electrically insulating material separates the rare-earth-sintered magnets one from another, with said electrically insulating material comprising an epoxy resin having a thickness of at least 0.03 mm; and
a stator having teeth wound by concentrated windings.

6. A motor comprising:
a rotor having a first interior permanent magnet including at least two stacked magnet pieces each comprising a rare-earth-sintered magnet coated with an electrically insulating material having a thickness of at least 0.03 mm such that the electrically insulating material separates the rare-earth-sintered magnets one from another; and
a stator having teeth wound by concentrated windings.

7. A motor comprising:
a rotor having an axis of rotation, and also having a first interior permanent magnet including at least two magnet pieces separated from one another in the direction of the axis of rotation by an electrical insulator, with said electrical insulator comprising an epoxy resin;
a stator having teeth wound by concentrated windings; and
at least one other interior permanent magnet circumferentially spaced from said first interior permanent magnet and including at least two magnet pieces separated from one another by an electrical insulator, with each of said interior permanent magnets having an N pole and an S pole, wherein said first interior permanent magnet has its N pole facing said stator and each circumferentially adjacent said at least one other interior magnet has its S pole facing said stator.

8. The motor according to claim 7, wherein said epoxy resin has a thickness of at least 0.03 mm.

9. A motor comprising:
a rotor having an axis of rotation, and also having a first interior permanent magnet including at least two magnet pieces separated from one another in the direction of the axis of rotation by an electrical insulator, with said electrical insulator comprising an epoxy resin having a thickness of at least 0.03 mm; and
a stator having teeth wound by concentrated windings.

* * * * *